United States Patent Office 3,258,178
Patented June 28, 1966

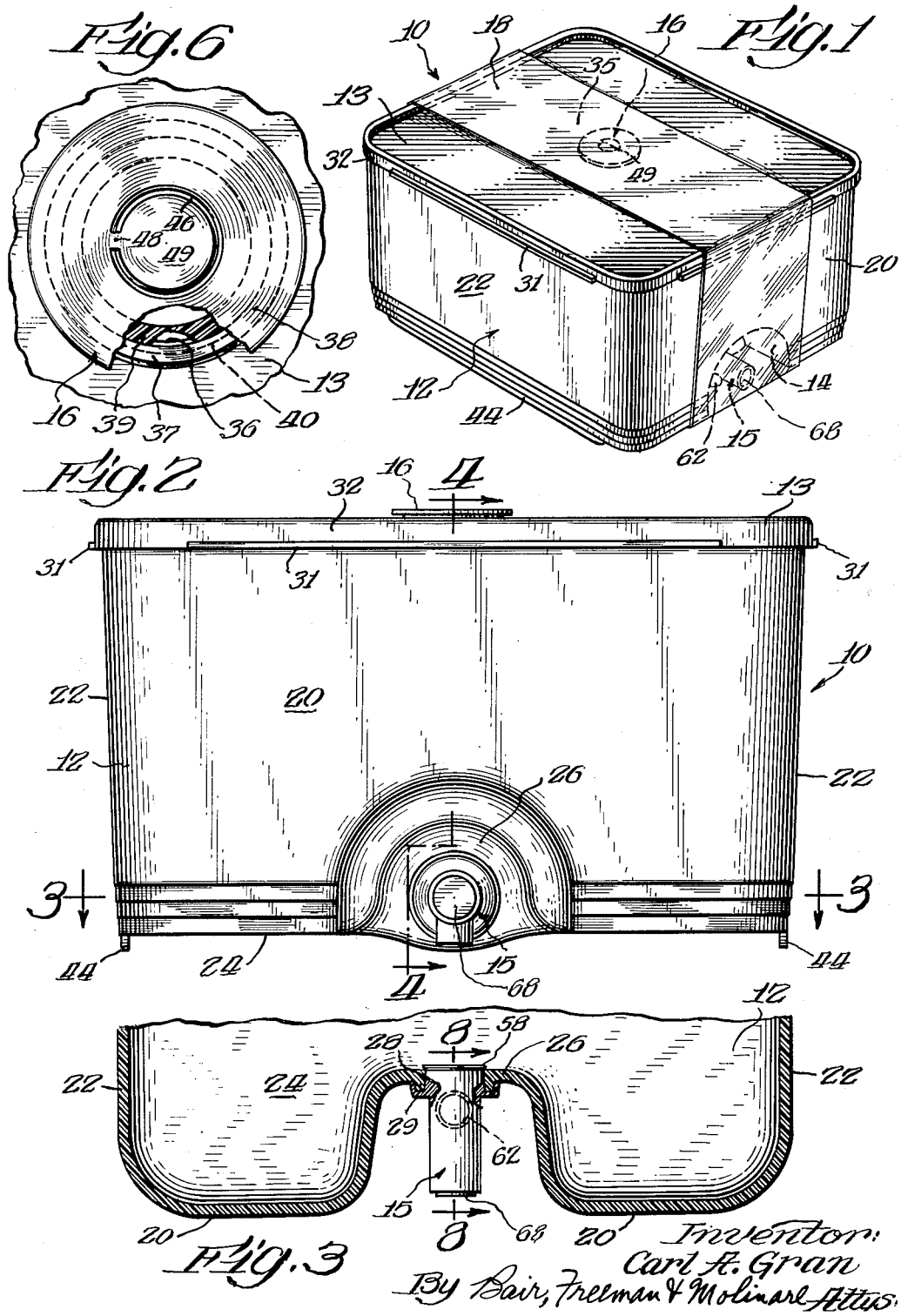

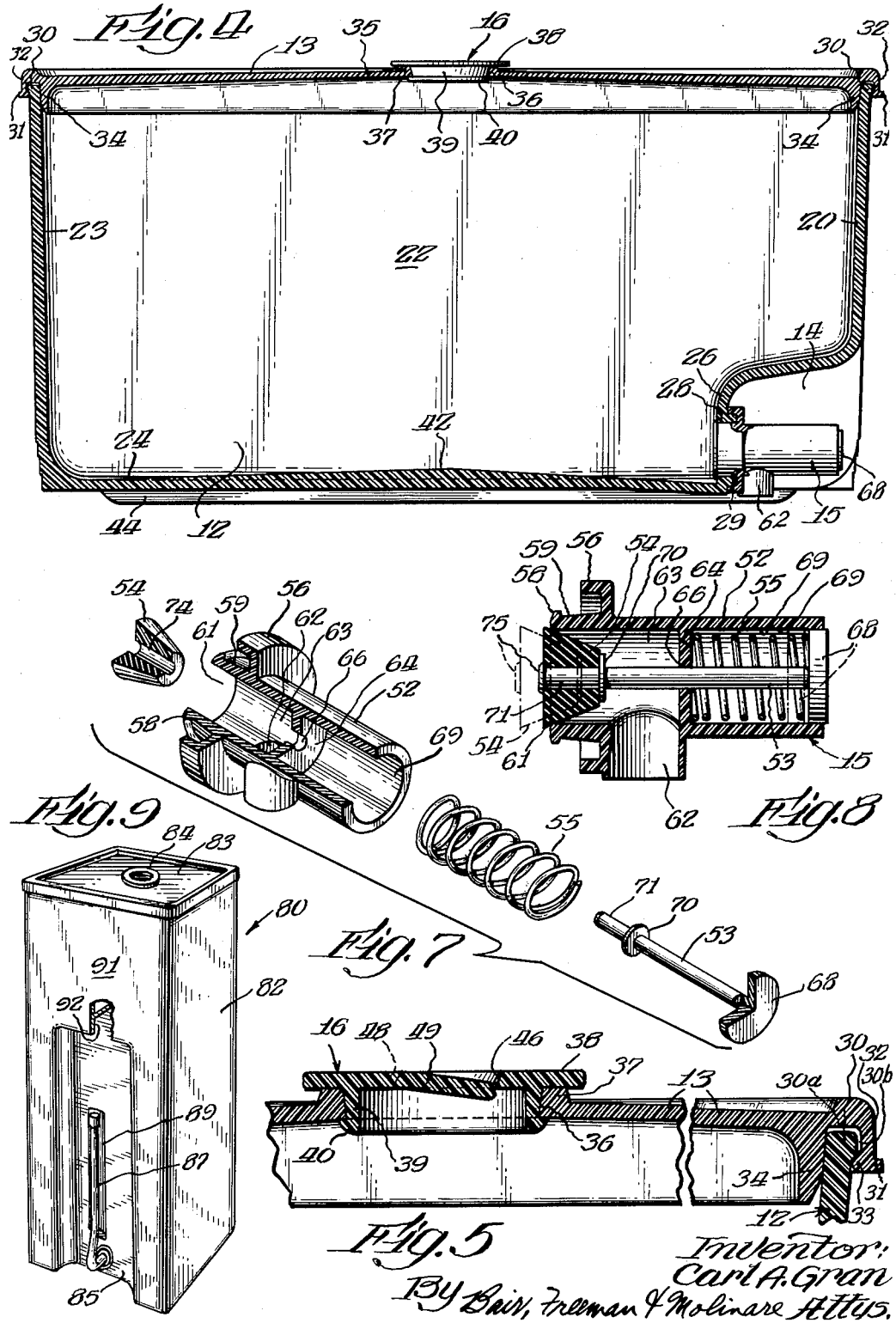

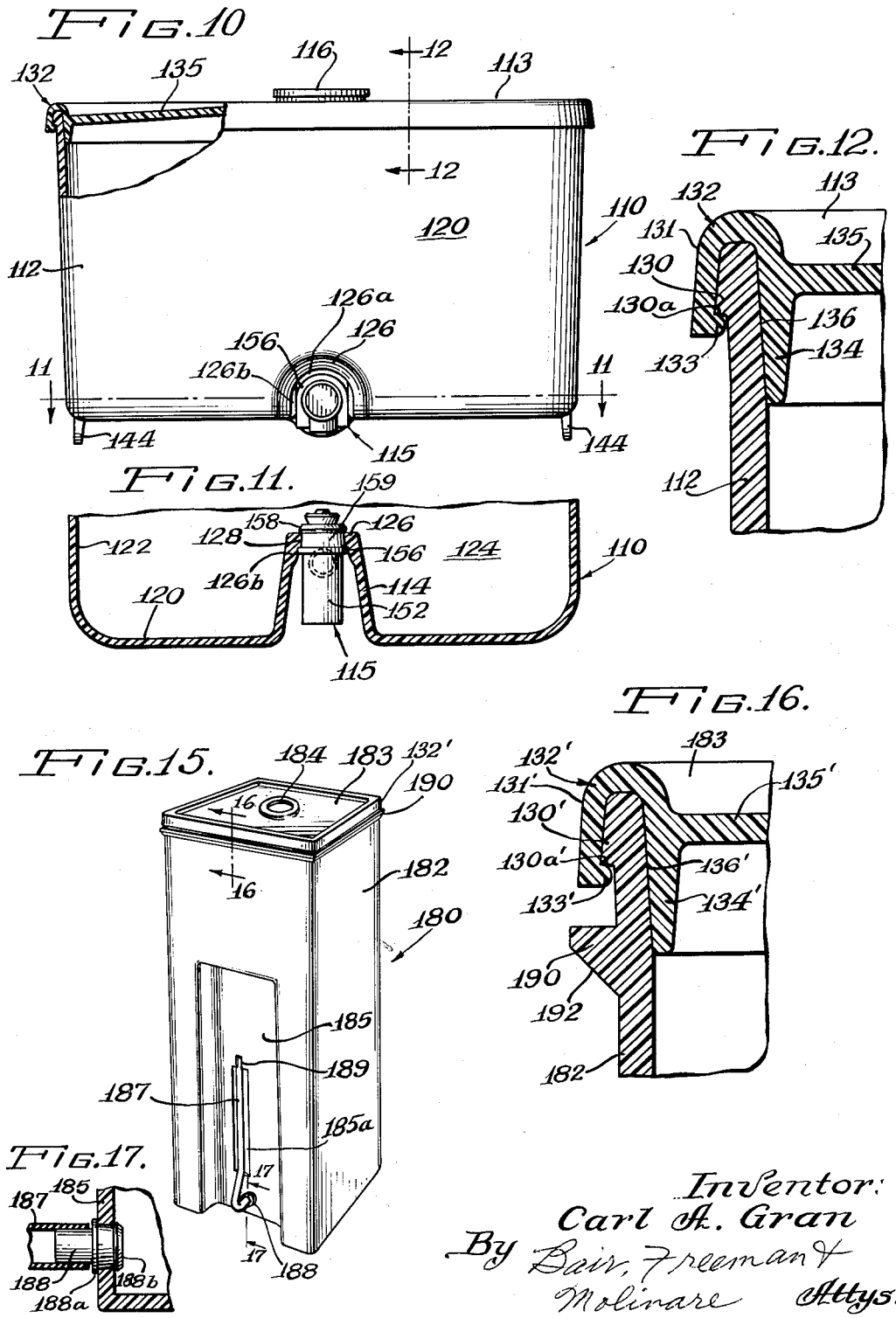

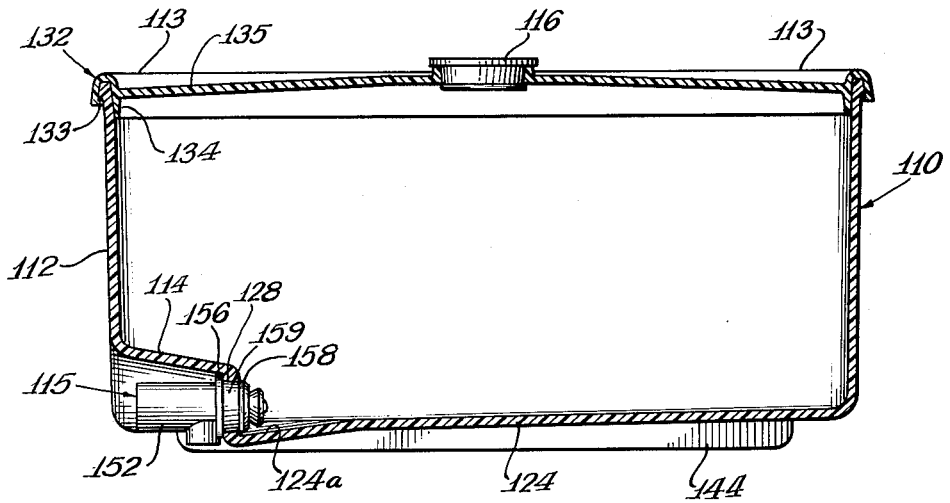
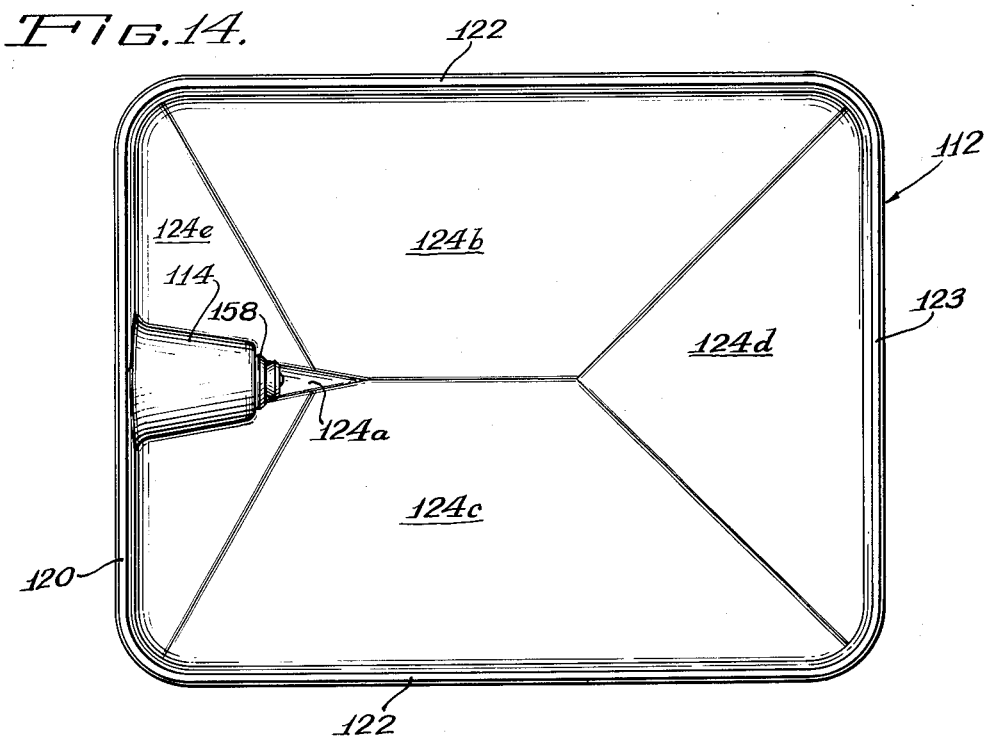

3,258,178
VALVED CONTAINER FOR LIQUID DISPENSER
Carl A. Gran, Arlington Heights, Ill., assignor to Magi-Pak Corporation, a corporation of Delaware
Filed Apr. 29, 1965, Ser. No. 453,560
6 Claims. (Cl. 222—482)

This application is a continuation-in-part of my copending application Serial No. 264,114, filed March 11, 1963, and entitled "Valved Container for Liquid Dispenser."

This invention relates to dispensing and, more particularly, to a refillable valved container for dispensing liquid comestibles such as milk, fruit juices, or the like. Further, this invention relates to novel means sealingly engaging a cover with a refillable container.

Refrigerated dispensers for liquid comestibles, such as milk and fruit juices, have found increasing acceptance in food serving establishments. Ordinarily, the dispenser has a refrigerated compartment within which a large relatively expensive metal container, as for example, a five gallon milk can, is stored. If made from stainless steel, the initial cost of the container is relatively high. Plated metal cans are less expensive initially but require frequent reconditioning and retinning to maintain requisite health standards. Pinch tube valve means or other valve mechanism is provided to selectively control the discharge of liquid from the container. Because of the bulky size and configuration of the conventional milk container, handling and storage thereof is difficult. During the off season, much warehouse space is taken up with these containers, which are not nestable one with another.

Thus, a primary object of the present invention is to provide an improved container for milk or like liquid comestible which is inexpensive to make, which is reusable and has long life, and which can be nested one within another to minimize storage space requirements.

The invention is particularly adapted for use as a milk dispenser both in the home and in food serving establishments, such as restaurants. Accordingly, the container must be easily handled when filled with milk. Because of the fact that milk provides a medium highly susceptible to the growth of microorganisms, the parts which contact the milk must be capable of complete cleaning.

Another object of the invention is to provide a container having a low ratio of weight to volume and a geometric configuration which lends itself to easy handling and thus to use in the home, as well as in commercial food serving establishments.

A further object of the present invention is to provide a molded plastic container having a molded plastic cover sealingly and detachably engaged with the sides thereof, such container being easily cleaned and handled.

Still another object of this invention is to provide a refillable molded plastic container with a molded plastic cover, which is adapted to be sealingly and detachably engaged with the sides thereof, the cover being adapted to be reused many times. These and other objects and advantages of this invention will be readily perceived from the following description.

These novel features and the novel structural components and their mode of functioning will be made most manifest and particularly pointed out in clear, concise and exact terms in conjunction with the accompanying drawings, wherein:

FIGURE 1 is a perspective view of a refillable valved container of the present invention illustrating a protective shipping band around the container;

FIGURE 2 is a front elevational view on an enlarged scale of the refillable valved container of FIGURE 1;

FIGURE 3 is a fragmentary cross-sectional view of the refillable valved container taken generally along the line 3—3 of FIGURE 2;

FIGURE 4 is a longitudinal cross-sectional view of the refillable valved container taken generally along the line 4—4 of FIGURE 2;

FIGURE 5 is a fragmentary cross-sectional view of the container on an enlarged scale illustrating the assembly of the cover to the sides of the container and the assembly of the closure plug to the cover;

FIGURE 6 is a fragmentary plan view on an enlarged scale of a portion of the cover of the container and the closure plug secured thereto;

FIGURE 7 is an exploded perspective view of one form of the novel discharge valve member for controlling the flow of liquid from the container;

FIGURE 8 is a cross-sectional view of the form of the novel discharge valve member of FIGURE 7 and is taken generally along the line 8—8 of FIGURE 3;

FIGURE 9 is a perspective view on a reduced scale of a modified container embodying the principles of the preferred embodiment relative to the container construction per se but having pinch-tube discharge means;

FIGURES 10–14 are directed to another form of container and cover assembly embodying the principles of the invention herein and wherein FIGURE 10 is a front elevational view of the modified form of construction;

FIGURE 11 is a fragmentary cross-sectional view taken generally along the line 11—11 of FIGURE 10;

FIGURE 12 is an enlarged fragmentary cross-sectional view taken along line 12—12 of FIGURE 10;

FIGURE 13 is in a longitudinal cross-sectional view of the container;

FIGURE 14 is a plan view of the container with the cover removed;

FIGURES 15–17 are directed to another form of the invention wherein FIGURE 15 is a perspective view of another modified container, similar to that shown in FIGURE 9, incorporating a guard rim for preventing undesirable separation of the cover from the container during handling and/or shipment;

FIGURE 16 is an enlarged detail view taken generally along the line 16—16 of FIGURE 15; and FIGURE 17 is a detail cross-sectional view taken along line 17—17 of FIGURE 15.

Referring now more particularly to the drawings, like numerals in the various figures will be employed to designate like parts.

As best seen in FIGURE 1, the dispenser or refillable valved container 10 of the present invention comprises an open-topped, box-like receptacle 12 having a cover 13 sealingly engaging the top edges of the receptacle and a discharge valve member or spout 15 detachably engaged in a recessed wall indicated generally at 14 in the front of the receptacle 12. After the container has been filled with milk or suitable liquid comestible, the inlet opening in the cover 13 is closed by means of a closure plug 16.

To facilitate handling and shipment and to protect the discharge valve member 15 which is constructed and arranged to be confined within the recess in the front wall of the receptacle, a wrap-around protective cover 18 made from a suitable plastic, such as polyethylene, is provided.

Considering now FIGURES 2, 3 and 4, there is shown more clearly the receptacle or container of the present invention. Preferably, the receptacle is molded from plastic, as for example polypropylene, and includes integrally formed front wall 20, side walls 22, rear wall 23 and bottom 24. The walls taper upwardly from the bottom so as to facilitate nesting of the receptacles 12 when the receptacles are to be stores.

The front wall 20 of the receptacle 12 includes a recessed wall portion 26. Provided in the recessed wall portion 26 is the discharge opening 28. An annular flange or rim 29 extending outwardly from wall 26 is defined about the discharge opening 28. The valved spout 15 is adapted to be sealingly engaged within the discharge opening 28 in a manner more clearly described later.

Annular rim means 30 are integrally formed on the sides of the receptacle adjacent the upper edges. A feature of the present invention is the novel cooperation between the interengaging portions on the cover 13 and the lip or rim 30 defined on the upper edges of the walls 20, 22 and 23 which results in a tight seal that will maintain tight even through extended use.

The cover member 13 has a generally L-shaped depending marginal flange 32 formed thereon abutting the outside of the rim 30 on the walls 20, 22 and 23, respectively. As seen most clearly in FIGURE 5, adjacent the bottom and extending inwardly on the annular flange 32, there is provided a bead 33 adapted to cooperate with the lower exterior corner on the rim 30.

Formed on the outside of the flange 32 are rims 31 for reinforcing the sides of the cover and for permitting easier gripping of cover 13 when it is desired to remove the cover from the receptacle. To form an improved seal, the rim 30 is spaced from the flange 32 along two sides as indicated at 30a and 30b. Depending downwardly from the cover 13 in spaced relation with the flange 32, is a depending flange 34, which has a surface mating with and being closely engaged with the tapered surface on the inner wall of the sides. The mating surfaces are about one-half inch wide. It is preferred that the taper on the surfaces of the engaging members be about five degrees with respect to the plane of the wall. The novel cooperation of the cover with respect to the walls of the receptacle assures the formation of a hygienic sealed compartment within the container.

Within the central portion 35 of the cover 13, there is provided a fill or inlet opening 36. After the container has been filled with the liquid, the closure plug 16 is inserted into the opening 36 to seal the compartment.

The closure plug or cap 16 comprises a generally planar top or sealing head 38, a central annular portion 39 integrally formed on the sealing head 38, and an annular bead 40 of slightly larger diameter than the minimum diameter of the fill opening 36 formed on the extremity of the central annular portion 39. The closure plug 16, preferably formed from a softer plastic than the container, as for example, polyethylene, is forced through the opening 36 until the rim 40 engages the underside of the material defining the opening. The periphery of the central annular portion 39 engages the annular raised wall 37 on the exterior of the cover and the rim 40 of the closure plug or cap 16 engages the inner wall of the cover 13 so as to provide a tight engagement between the closure plug and the cover. The tightness of the seal between the two parts is further assured by virtue of the cooperating taper between the sides of the annular portion 39 and the portion of the cover 13 defining the opening 36, which taper is preferably on the order of five degrees.

As is evident from FIGURE 4, the central portion 35 of the cover 13 is raised with respect to the ends of the cover. By virtue of this construction, an oil-can type of operation of the cover with respect to the receptacle is provided. This is necessary to facilitate removal of the cover from the receptacle when it is desired to clean the container after use, inasmuch as the seal provided between the flanges on the extremities of the cover and the upper edges of the walls of the container is of a high quality.

To assure that substantially all of the liquid contained within the container is drained from the container 12 during use, the center of the bottom 24 of the container is raised as indicated generally at 42, then slopes toward discharge opening 28, where a sump is provided.

The bottom of the container may be provided with legs 44, which are adapted to be positioned adjacent flanges 30 on a cover when one filled container is stacked atop another. Further, the legs space the bottom of a container 10 from a shelf or another container so as to permit the circulation of air entirely about the container 10, when it is stored in a refrigerated compartment of a dispenser. Circulation of cool air about the container will result in maintenance of a relatively constant and uniform temperature of the liquid within the container.

Considering specifically FIGURES 5 and 6, there is illustrated in enlarged scale the connection of the cover to the sides of the container and the connection of the closure plug to the cover 13. It will be noted that the disposable closure plug 16 has defined in the central portion thereof a scoring 46 generally circular in configuration. The scoring 46 is discontinuous so as to provide unscored portion 48, which is adapted to retain the cut-out portion 49 after puncturing of the cut-out portion 49 along the scoring 46. In use, the container is filled with liquid comestible through the fill opening 36 defined in the cover 13. Then the closure plug 16 is inserted into the opening to seal the container. After delivery and prior to use, the consumer can press downwardly upon the cut-out portion 49, causing the scoring 46 to break and the cut-out portion to move downwardly as indicated in FIGURE 5, thus permitting air to enter the container as milk is withdrawn therefrom.

If desired, cover 13 can be integrally molded without fill opening 36, thus eliminating closure cap 16. Permanent vent means may be provided in the cover for venting the interior of the container. Such vent means may comprise a labyrinth-type passageway defined in flange 32 and extending in three sides of the flange along about 180 degrees. The passageway, which is an extension of the chamber defined between the exterior of rim 30 and the interior of flange 32, communicates at one end to the atmosphere by means of a notch in flange 32 of cover 13 and communicates at the other end to the interior of the container by means of a notch in flange 34 of cover 13.

Turning now to a consideration of the disposable snap-in discharge valve member 15 which forms a part of the present invention, it will be seen that the valve member consists of four components: a housing 52, a valve stem 53, a valve 54 and a bias spring 55 for biasing the valve to the closed position.

Formed on the molded tubular housing 52 adjacent the connection to the container 12 is an annular flange 56 generally L-shaped in cross section. The annular flange 56 is adapted to cooperate with the outwardly extending annular flange or rim 29 on the container. Adjacent the end of the housing 52 and spaced from the annular flange 56, there is provided a deformable bead 58, which is of a slightly larger diameter than the minimum diameter of discharge opening 28. The surface 59 of the housing defined between the annular flange 56 and the bead or rim 58 on the housing 52 tapers generally toward the discharge opening or end of the housing at an angle of about five degrees.

As best seen in FIGURE 3, the bead 58 is adapted to be inserted through the discharge opening 28 and to engage the inner surface of the recessed wall 26. The annular flange 56 will engage the annular flange or rim 29 provided about the discharge opening and in this manner the discharge valve member 15 is sealingly and detachably engaged with the container 12. The taper on the annular portion 59 corresponds to the taper on the wall of the container defining the discharge opening 28 so that the two surfaces sealingly engage one another.

The elongated housing 52, which is preferably cylindrical, is open at each end and has a side opening defined intermediate the ends thereof. The housing 52 is preferably made from a softer plastic than the container so as to minimize wear about the discharge opening 28, as it is intended that the container will be used many times, whereas the snap-in valved spout will be used only once and then discarded. A valve seat 61 is defined within one end of housing 52. The housing 52 includes a transverse, radially extending outlet opening 62 which communicates with the inlet opening via a passageway 63 through the housing, a portion of the passageway 63 being defined by a transverse wall 64 in the housing 52. The transverse wall 64 thus, in part, partially bounds two spaced open-ended chambers defined in housing 52, with the first chamber arranged to have liquid flow therethrough for discharge through outlet opening 62.

Disposed in housing 52 and slidingly engaged within a small opening 66 located centrally in the transverse wall 64 is the elongated valve stem 53. The stem 53 is of plastic material and cooperates with the transverse wall 64 which defines the edges of bore 66 to serve as a seal means for inhibiting leakage of liquid through bore 66. Formed on the end of the valve stem remote from the inlet opening is a head 68, which conforms generally to the internal configuration of the housing and is adapted to slide in the bore, or second chamber, 69 of the housing 52. The stem 53 includes a flange or abutment shoulder 70 defined at the intersection of the reduced diameter end part 71 and the relatively larger stem portion. The end 71 of stem 53 extends through bore 74 in valve 54 and carries the valve thereon, with the bottom of valve 54 engaging flange 70. The tip of stem 53 is heated and upset to form plug end 75 for retaining valve 54 on stem 53. The valve stem 53 is preferably molded from the same material as the container 12 and the valve plug 54 is preferably made from a relatively soft plastic, rubber or like material. These materials must be inert so as to impart no objectionable taste or smell to the liquid comestible with which it comes into contact. The bias spring 55, which is adapted to seat the valve against the valve seat 51, is positioned in the second chamber of housing 52 between the transverse wall 64 in the housing and the head 68 on the valve stem 53.

An important feature of the valve construction is that the valve head 68 is slightly out of round with respect to the bore 69 in the valve housing 52. This permits free air movement between the compartment defined within the housing and the exterior thereof so as to permit free movement of the valve stem 53. The creation of a pressure block which would tend to interfere with movement of the valve stem is obviated.

When the liquid is to be discharged from the container, the valve stem 53 may be actuated to the left as viewed in FIGURE 8 by pressing against the head 68 sufficient to overcome the spring force biasing the valve closed. The valve 54, which as shown is of frusto-conical shape with a portion thereof of smaller dimension than valve seat 61 and another portion thereof of greater dimension than valve seat 61, is then displaced away from the valve seat 61 and liquid may pass through the passageway 63 and flow from the valve member 15 through the discharge opening 62. Upon release of the force urging the valve stem 53 to the left, the spring 55 will bias the valve stem to the right against valve seat 61, thus closing the valve and preventing discharge of liquid from within the container.

Referring now to FIGURE 9, there is illustrated a modified dispenser or container of the present invention. The modified container 80 comprises a receptacle 82 and a cover 83 sealingly engaged therewith in the same manner as the cover of the preferred embodiment of the invention. The cover 83 has an opening therein closed by a closure plug 84, which is the same as the closure plug defined in the preferred embodiment of the invention. The front wall of the receptacle 82 is recessed as indicated generally at 85. The discharge opening is provided in the recessed wall. A valve of the present invention may be utilized in the discharge opening, or the discharge opening may be provided with a pinch-tube discharge means indicated at 87. Forwardly extending flanges 89 are provided on the recessed wall 85 to engage the pinch tube and retain it in position on the front wall during shipment of the dispenser package 80.

As indicated by the break-away portion of the illustration, the front wall 91 depends downwardly over the recess defined in the front wall so as to provide a handle 92 on the wall to aid handling of the container. The rear wall of the container may be similarly recessed so as to provide a pair of handle means to facilitate handling and lifting of the container. The container illustrated will typically be utilized for seven gallons of liquid comestible.

Referring to FIGURES 10–14, there is illustrated a modified dispenser 110. The dispenser 110 comprises an open-topped, box-like receptacle having a cover 113 sealingly engaging the top edges of the receptacle and a disposable valved spout 115 detachably engaged in a recessed wall 114 in the front wall 120 of the receptacle. Although not shown, it will be understood that covered receptacle 110 with disposable spout 115 attached thereto is adapted to receive a wrap-around protective cover similar to cover 18 described hereinabove. In the modified form of the invention, the innermost end of the recess 114 that is adjacent the wall 126 is of a specific cross section, and as shown, includes a generally semicircular upper portion 126a which merges into a pair of spaced, parallel upright sides 126b.

The disposable valved spout 115, which is adapted for snap-in engagement with the discharge opening 128 defined in the rearmost portion 126 of the recessed wall 114, is provided with an aligning flange 156, which is specifically shaped to provide a top portion that is generally semicircular in configuration as viewed from the front, and whose bottom portion will not register with the semicircular upper portion at the inner end of recess 114. The configuration of said top portion of flange 156 is complementary to the configuration of the upper surface defining recess 114, with the sides of the flange 156 engaging with the adjacent surfaces 126b of recess 114 (FIGURE 11). This construction requires a precise aligning of the disposable valved spout 115 within the recess 114 prior to the spout being snapped into the opening 128 in the dispenser 10.

In general, the disposable valved spout 115 corresponds to the spout 15. Reference may be made to my co-pending application (Case No. 64,365) Serial No. 451,-751, filed April 29, 1965, for specific details of the disposable valved spout 115.

For use, the valve-seat end of the housing of valved spout unit 115 is inserted through opening 128. The annular bead 158 is adapted to engage the interior of the front wall 120 of receptacle 112 and the flange or abutment means 156 is adapted to engage the exterior surface of wall 120. The exterior surface portion 159 of the housing tapers toward the valve-seat end of housing 152 and engages with a similarly tapered surface in wall 120 which defines opening 128. The abutment bead 158 and the flange 156 are spaced apart a distance equal to the thickness of wall 126 defining the opening 128. By this arrangement, the housing 152 is engaged securely within opening 128 with a snap-fit for use and the valved spout 115 can be removed from the opening to permit complete cleaning of the container 110.

The dispenser 110 illustrated in FIGURES 10–14 is generally like that illustrated in FIGURES 4 and 5. The open-topped, box-like receptacle 112 is preferably molded from plastic, as for example, polypropylene, and includes integrally formed front wall 120, side walls 122, rear wall 123 and bottom 124. The front, rear and side walls taper upwardly and outwardly from the bottom so as to facilitate nesting of the receptacles 112 when the receptacles are to be stored. A molded cover 113 is adapted to sealingly engage the top edges of the receptacle 112.

A feature of the present invention is the novel cooperation between the interengaging portions on the cover 113 and the upper edges of the side walls, front wall and rear wall, which results in a liquid-tight seal that will remain tight even through repeated use of receptacle 112.

The cover 113 is provided with a pre-formed marginal connector 132 that is generally of inverted U-shape in cross section, and so as to cooperate with the shaped peripheral rim 130 defined on the receptacle 112. The lower end of the outer leg of the U is provided with an inwardly extending continuous peripheral abutment bead 133 that is adapted to snap under and engage the outwardly extending continuous enlarged peripheral shoulder 130a on the rim. The inner leg of the U merges into a continuous peripheral leader 134 that depends below the top wall 135 of the cover and which assists in assembly of the cover 113 on the receptacle 112.

The lower portion of the upright walls of receptacle 112 normally diverge outwardly at a very small angle of about 1°, to permit easy removal of the receptacle from its mold. However, the upper portion of each upright wall of the receptacle, the portions thereof which are adapted to cooperate with the cover 113, are provided with a different wall slope and in the preferred embodiment, the inner and outer upright surfaces of rim 130 each incline at about 5° to the vertical, and in opposite directions so that the included angle is 10°. The inner upright walls of the legs of the U of connector 132 are similarly inclined, each at 5° to the vertical so that the included angle between said legs is 10°. This increased angle of slope of wall members that are adapted to snap together is desirable as a better and tighter peripheral seal is effected than when the angle is very small, such as 1°, and where there may be some variations from a precise dimension. An angle larger than about 5° causes problems in assembly and disassembly. In the embodiment therein, the portion of the upright walls that employs the increased slope of 5° is that portion which is to be engaged by the sections of the marginal connector 132 and the leader 134. The portion of the inner wall surface that is thus engaged is indicated at 136 and is about one-half inch wide.

When the cover 113 is assembled on receptacle 112, the juncture of the top wall 135 with the marginal connector 132 lies at a level below the upper edge of rim 130. The rim 130 is enlarged relative to the receptacle wall therebelow, as can be seen in FIGURE 12, and this imparts increased rigidity to the rim against which the flexing legs of the connector 132 may be forced in assembly. The top wall 135 is bowed, or sloped, upwardly from its peripheral junction with marginal connector 132 to the center of top wall 135, as best seen in FIGURES 10 and 13, so that the connector 132 may distort in assembly on rim 130 and so that any force against the center of top wall 135 tends to effect a reaction peripherally along marginal connector 132.

The portions 131 and 134 of connector 132 abut the rim 130 and inner surface of the upright receptacle sides respectively. Further, the portions 131 and 134 tend to clamp the upper edges of the upright sides of the receptacle therebetween. The bead 133 on portion 131 engages beneath shoulder 130a to secure the flange 132 in place and bowed central portion 135 tends to apply force against the cooperating mating surfaces of the connector 132 and the enlarged rim portion 130 of the receptacle for further forcing the connector against the rim and thereby insuring the formation of a hygienic and essentially hermetically sealed compartment within the container.

The central portion 135 of the cover 113 may be provided with a filler inlet opening that is adapted to be closed by a closure plug, as described hereinabove with respect to dispenser 10.

Another advantage of bowing the central portion 135 of the cover 113 or raising the centermost portion with respect to the ends of the cover is that an oil can type of operation of the cover with respect to the receptacle is provided. By pressing down upon the centermost portion of cover 113, the sides of receptacle 112 yield outwardly, thereby facilitating removal of the cover from the receptacle when it is desired to clean the container after use.

As best seen in FIGURES 13 and 14, the bottom 124 of receptacle 112 is provided with sloping portions 120b, 120c, 120d and 120e which converge downwardly toward the central part of the bottom and toward sump portion 124a for facilitating the drainage of all liquid into the sump portion 124a and out of the container through discharge opening 128. It will be understood that the portion 124d slopes downwardly toward the sump 124a and that the line of intersection between portions 124b and 124c slopes toward sump 124a.

The bottom of the container is provided with depending legs 144 for spacing the bottom of one container 10 from the top of another container or from the top of a shelf so as to permit the circulation of air entirely about the container 10 when it is stored in a refrigerated compartment. Circulation of cool air about the container will result in maintenance of a relatively constant uniform temperature of liquid within the containers. Further, the legs 144 are spaced apart a distance substantially equal to the distance between parallel flanges 132 of cover 113. Such arrangement, wherein the legs of one container may be supported adjacent to and within flanges 132 of a cover on another container, facilitate stacking of one container upon another.

In FIGURES 15–17, there is illustrated another modified dispenser or container embodying the principles of the invention. The modified container 180 comprises a receptacle 182 and a removable cover 183 which sealingly engages with the top of the side walls of the receptacle in the same manner as the cover 113 is engaged with the receptacle 112 illustrated in FIGURES 10 and 12. The cover 183 is provided with a fill opening that is adapted to be closed by a closure plug 184.

The front wall of the receptacle 182 is recessed as indicated generally at 185. A discharge opening is provided in the rear of recessed wall 185. A disposable snap-in valve may be affixed in the discharge opening or the discharge opening may be provided with a pinch-tube discharge means 187 including an adaptor 188. The adaptor 188 comprises a housing affixed at one end to tube 187 and having spaced flanges 188a and 188b formed thereon for gripping the wall 185 of the container therebetween. Flanges 189 are defined on wall 185 adjacent the sides of centrally recessed area 185a for receiving and engaging with the pinch tube and retaining it on the front wall during shipment of the dispenser package 180.

An important feature of the container illustrated in FIGURES 15–17 is the provision of a guard rim 190 to prevent inadvertent removal of the cover from the receptacle during handling or shipment. The guard rim 190 is formed peripherally on the receptacle in spaced relationship below rim 130. Such spacing is greater than the thickness of bead portion 133' to prevent interference with the cover during sealing. It has been found that in the absence of the guard rim 190, the cover 183 of adjacent containers sometimes engages beneath the rim or flange 132' of an adjacent cover 183' and upon jarring or tilting will cause the cover of the adjacent container to be lifted, thus breaking the hygienic seal of the adjacent container, and often permitting spilling of a portion of the contents thereof.

The outwardly extending peripheral rim 190 includes a lower upwardly and outwardly tapering surface 192. The guard rim 190 extends from the outer surfaces of the sides of receptacle 112 a distance at least equal to and preferably greater than the width of the lower end of flange portion 131 of flange 132. In normal use, the cover 183 may be applied to and removed from the receptacle 182 in the same manner as cover 113 may be applied to and removed from container 110 described in FIGURES 10–14. If one container should be tipped or raised with respect to an adjacent container, the first cover 183' will engage the upwardly and outwardly inclined surface 192 of the guard rim 190 and thus be guided away from interlocking engagement with the adjacent cover, thereby preventing the dislodgment of the cover on the second container.

Further, the rim 190 functions to stiffen the upper edge of each side of the receptacle adjacent the end of depending flange 134', thus assuring firm sealing between the inner sloped surface of a side of receptacle 182 and the cooperating mating surface on leader 134'.

The cover 183' is essentially the same as the cover 113, differing only in cross-sectional configuration. Similarly, the U-shaped marginal connector 132' on the cover 183' is essentially the same as that described heretofore with respect to FIGURE 12 and accordingly, the numerals indicating like elements in FIGURE 16 have been primed and further description is believed unnecessary.

The containers preferably are formed of a readily molded and easily cleaned plastic, such as polypropylene, and can be made in a variety of forms. The improved container is of excellent impact absorption and has superior resistance to dents, thus promoting longevity in use. Another advantage of the container of the present invention over comparable metal containers is that it has a lower tare weight in relation to capacity.

The containers are provided with removable covers which are sealingly engaged with the sides of the container to provide a hygienically sealed compartment therewithin. In one form of the invention, a peripheral guard rim is provided on the containers adjacent to the top edges of the receptacles for preventing inadvertent removal of the cover from one container due to engagement thereby with the cover from an adjacent container. The covers may be removed for ease of cleaning and are reusable over extended periods of time without loss of sealing efficiency. The containers are so designed that with the covers removed, they are nestable one within another to conserve space while in storage. Further, the interior surfaces will release dried milk products and other contaminants more easily than metal surfaces and are readily visible for inspection for cleanliness.

The geometric configuration of the container is compatible with present automatic filling equipment and automatic washing equipment utilized by the dairies, and lends itself to easy handling in the home or in a commercial food servicing establishment, such as a restaurant or cafeteria.

By removal of the inexpensive plastic snap-in valved discharge spout, cleaning of the container is facilitated. The front wall of the container is recessed so as to confine the valved discharge spout therewithin and provide protection for the discharge spout during transport of the filled container. The recessed wall is constructed and arranged to cooperate with the valved discharge spout so as to provide for proper indexing of said spout in the discharge opening in the container.

The containers are constructed and arranged to accommodate a wrap-around protective cover for protecting the disposable valved spout during shipment and handling.

Substantial economy is effected by the modest initial cost of the reusable container and by the greatly reduced cost of packaging of the novel container as compared with either reusable metal cans or single service, wax or poly-coated cartons.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

I claim:

1. A molded plastic container for liquid comestibles or the like comprising, in combination: a box-like structure having upwardly and outwardly sloping sides and an open top, an annular rim integrally formed on the outer surfaces of the sides of said structure adjacent the upper edges of said sides, the inner surface of the sides proximate the rim being tapered outwardly from the plane of the sides; and a cover adapted to close said open top, said cover having a central portion, an annular depending flange having a taper corresponding to that of the tapered inner surface of said side for sealing engaging said tapered inner surface, and an annular marginal flange extending outwardly from said depending flange and constructed and arranged to engage said rim on said structure for retaining said cover in sealing engagement with said structure, whereby said box-like structure is nestable within a like box-like structure when the cover is removed, said box-like structure having a discharge opening adjacent the bottom thereof through which liquid comestibles may be discharged, and said cover having an inlet opening defined therein through which liquid comestibles may be poured into the container, a closure cap sealing engaged in said inlet opening, said closure cap having a generally planar top and an annular flange portion depending downwardly therefrom, said annular flange sealing engaging the portion of the cover defining said inlet opening, the top of said closure cap having a scored surface therein, whereby when said container is filled with liquid comestibles, said closure cap is inserted into said cover to provide a sealed chamber within said container, and when it is desired to discharge liquid comestibles from said container, said scored surface is manually displaced to permit air to enter the top of the sealed chamber.

2. A molded plastic container for liquid comestibles or the like comprising, in combination: a receptacle having upright sides, an open top, a peripheral rim integrally formed on said upright sides adjacent the upper edges of said sides and defining an outwardly extending peripheral abutment shoulder, the inner surface of the sides proximate the rim being sloped upwardly and outwardly relative to vertical, and a cover adapted to close said open top, said cover having a central portion, a marginal connector of generally inverted U-shape, and a depending leader provided with a slope corresponding to that of said sloped inner surface of said sides for guiding assembly of said cover onto said receptacle and for sealingly engaging said sloped inner surface, and one leg of said U-shaped connector being spaced outwardly of said depending leader and constructed and arranged to engage the exterior of said rim on said receptacle, and a bead on said one leg of the connector for engaging with said abutment shoulder on said annular rim to retain said cover in sealing engagement with said receptacle.

3. A molded plastic container as in claim 2 wherein said central portion of said cover is raised above the level of said annular flanges for facilitating removal of said cover from said box-like structure, whereby when the central portion is pushed downwardly the annular flanges are more readily freed from said annular rim on said box-like structure.

4. A molded plastic container as in claim 2 wherein said structure has a discharge opening adjacent the bottom thereof, the walls of said discharge opening being tapered inwardly to provide for sealing engagement with a valved spout which is adapted to be retained in said discharge opening, said cover having an inlet opening defined in the central portion thereof, the walls of said inlet opening being tapered inwardly to provide for sealing engagement with a closure cap, which is adapted to sealing close the inlet opening in said cover.

5. A molded plastic container as in claim 2 including an annular guard rim formed peripherally on the outer surfaces of the sides of the receptacle generally parallel to and spaced from said peripheral rim, said guard rim being greater in extent from said outer surfaces of said sides than the outer edge of said one leg of said U-shaped connector for preventing dislodgment of said cover from the receptacle due to jarring or tilting by an adjacent container.

6. A molded plastic container as in claim 2 wherein the central portion of said cover joins the marginal connector at a level below the upper edge thereof, the juncture of the central portion of said cover with the marginal connector being below the upper edge of said rim.

References Cited by the Examiner

UNITED STATES PATENTS

| 2,714,475 | 8/1955 | Roehrich | 222—182 X |
| 2,756,793 | 7/1956 | Tupper | 150—.5 |
| 2,984,382 | 5/1961 | Florsheim | 220—60 |
| 3,080,087 | 3/1963 | Cloyd | 220—60 X |
| 3,117,692 | 1/1964 | Carpenter et al. | 220—60 |
| 3,142,415 | 7/1964 | Louchheim | 222—185 X |
| 3,193,130 | 7/1965 | Miller | 222—60 X |

RAPHAEL M. LUPO, *Primary Examiner.*

CHARLES R. CARTER, *Examiner.*